Inventors:
Alfred Bauer
Walter Klossika
By: Spencer & Kaye
Attorneys

Inventors:
Alfred Bauer
Walter Klossika
By: Spencer & Kaye
Attorneys

Inventors:
Alfred Bauer
Walter Klossika
By: Spencer & Kaye
Attorneys

United States Patent Office 3,450,956

Patented June 17, 1969

3,450,956

METHOD FOR SIMULTANEOUSLY CONTACTING A PLURALITY OF ELECTRODES OF A SEMICONDUCTOR ELEMENT

Alfred Bauer, Weinsberg, and Walter Klossika, Heilbronn, Germany, assignors to Telefunken Patentverwertungsgesellschaft m.b.H., Ulm (Danube), Germany Filed Oct. 12, 1966, Ser. No. 586,159

Claims priority, application Germany, Oct. 15, 1965, T 29,584

Int. Cl. H01l 5/02, 7/00

U.S. Cl. 317—234 8 Claims

ABSTRACT OF THE DISCLOSURE

Method for electrically contacting electrodes of a semiconductor element with terminal posts of a support base. A planar contacting disc, with a plurality of inwardly directed tongues and holes is placed adjacent the support base so that each post thereof passes through a respective hole on the disc; said post being electrically connected to the disc in the region of its respective hole. The semiconductor element is then placed on the disc. Each electrode of the semiconductor element contacts a respective tongue and is electrically connected thereto. Subsequently, portions of the disc are removed to electrically isolate the electrodes from each other; each electrode being connected to only one of the posts. The intermediate product formed by the practice of the described method.

The present invention relates to a method for connecting semiconductor elements, and particularly to a method for connecting semiconductor elements formed in a single semiconductor wafer, such elements being exemplified by transistors, diodes and intergrated circuits.

The present invention is particularly intended to be practiced on semiconductor elements having all of their electrodes extending from one planar surface. However, the method of the present invention can also be applied to semiconductor elements of the type having one or more electrodes extending from a different surface than the remaining electrodes.

Various techniques have already been suggested for contacting the electrodes of semiconductor elements, particularly in those cases where all of the semiconductor element electrodes extend from a single planar surface of the element, without requiring the provision of intermediate thin-wire electrode lead wires.

According to one such suggested technique, metallic contact islands are sprayed onto a support base of insulating material in such a manner that each island makes electrical contact with one of the connecting pins, or posts, extending through the support base, the contact islands being electrically isolated from one another. The semiconductor element is then placed in position with its electrode-containing surface facing the semiconductor islands and each island is electrically connected to a respective one of the electrodes.

The electrodes may be preliminarily formed on the semiconductor element by first coating the semiconductor element with a glass passivation layer, then providing small openings in this layer, and finally attaching small hemispherical metallic electrodes to the semiconductor element through these openings. When such a semiconductor element is provided, contact can be made to the metallic islands without requiring the provision of a depletion layer or intermediate thin lead wires.

It should be noted that the above described technique is limited to use with support bases having at least a surface layer of insulating material facing the semiconductor element.

It is a primary object of the present invention to eliminate the drawbacks inherent in such prior art techniques.

Another object of the present invention is to provide an improved method for contacting the electrodes of a semiconductor element.

A further object of the present invention is to provide a simplified method of contacting the electrodes of a semiconductor element.

Yet another object of the present invention is to provide a particularly simple method for contacting the electrodes of semiconductor elements all of whose electrodes extend from a single planar surface.

These and other objects according to the present invention are achieved by a novel method for electrically contacting electrodes of a semiconductor element which extend from one substantially planar surface of the element with terminal posts of a support base. This method is carried out by placing a planar contacting disc having a plurality of post-receiving holes, one for each post, and which is cut out to have a plurality of inwardly directed tongues, one for each electrode, adjacent the support base so that each post passes through a respective one of the holes, and electrically connecting each post to the disc in the region of its associated hole, placing the semiconductor element on the disc with the electrodes thereof in contact with the respective tongues, electrically connecting each tongue to a respective electrode, and removing portions of the disc for electrically isolating the electrodes from each other and leaving each electrode electrically connected to only a respective one of the posts.

The present invention also involves an intermediate product in the manufacture of a semiconductor device. This product includes a support base having a plurality of terminal posts extending therethrough, a planar contacting disc disposed on the base, and a semiconductor element, disposed on the disc. The contacting disc has a plurality of post-receiving holes, each fitted around a respective post, and is cut out to have a plurality of inwardly directed tongues. Each post is electrically connected to the disc in the region adjacent its associated hole. The semiconductor element has a plurality of electrodes extending from one surface thereof, with each electrode directly contacting, and being electrically connected to, a respective tongue. Upon subsequent removal of portions of the disc, each electrode will be electrically connected to only a respective one of the posts.

Additional objects and advantages of the present invention will become apparent upon consideration of the following description when taken in conjunction with the accompanying drawings in which.

Figure 1:
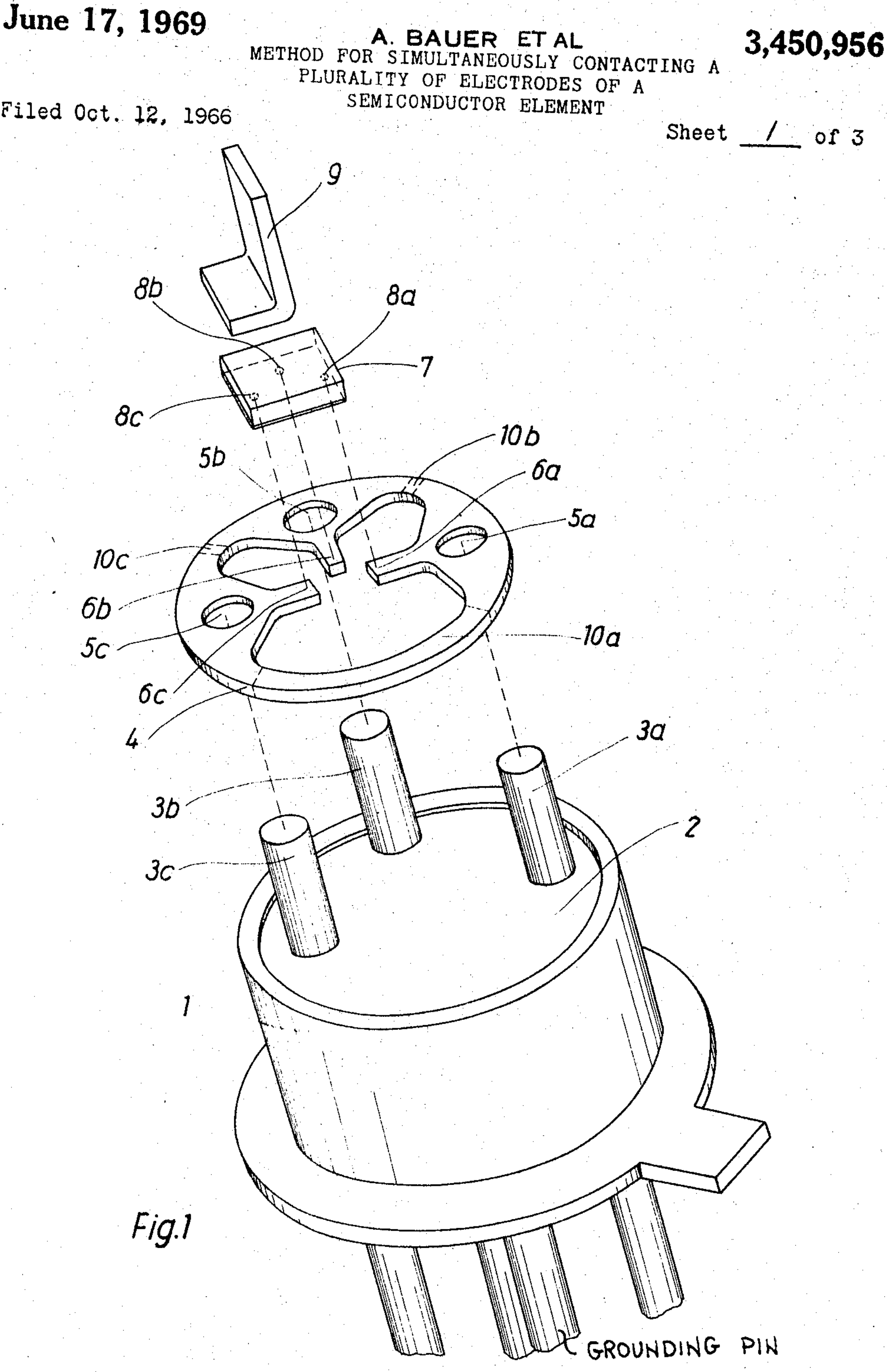
FIGURE 1 is a perspective view illustrating one arrangement for carrying out the method according to the present invention.

FIGURE 1 is an exploded view showing all of the elements necessary for assembling a semiconductor device according to the present invention. The base for the semiconductor assembly is constituted by a header which includes an eyelet 1 and a base in the form of a disc 2 preferably made of insulating material. The disc 2 serves as a support base for the semiconductor assembly and carries three external lead wires, or posts, 3*a*, 3*b* and 3*c* which serve as the electrode leads for the semiconductor device.

Disposed directly above the header is a planar contacting disc 4 which is to be fitted around the posts 3 so as to rest on the upper surface of disc 2. Contacting disc 4 is preferably made of a material which readily lends itself to mechanical treatments, i.e., cutting. To this end, the disc 4 may be made of a tin-antimony or lead-arsenic alloy, although other alloys and materials having suitable properties may also be used. The material from which disc 4 is made should also be capable of being welded or soldered to the posts 3.

Disc 4 is provided with three bores 5*a*, 5*b* and 5*c*, through which the posts 3*a*, 3*b* and 3*c*, respectively may pass. This disc is further provided with a cutout which is shaped to define three inwardly extending contacting tongues 6*a*, 6*b* and 6*c*. The disc is also provided with portions 10*a*, 10*b* and 10*c* which are to be subsequently removed. The borders of these portions are indicated by broken lines.

Above disc 4 there is shown a semiconductor wafer 7 located in line with the position which it will assume on the tongues 6*a*, 6*b* and 6*c*. The broken lines extending from the disc 7 to the tongues 6 indicate the respective locations on the lower surface of the semiconductor wafer 7 which will be connected to each of the tongues. Each of these locations corresponds to a respective one of the semiconductor electrodes 8*a*, 8*b* and 8*c*. Wafer 7 is not provided with any depletion layer in the region where these connections will be made.

Finally, there is provided an angled piece 9 which is made of a material having good heat dissipating properties and which is to be mounted on the wafer 7 for improving the heat dissipation of the assembly. The lower surface of piece 9 is provided with a layer of solder material.

In order to assemble the arrangement, the disc 4 is first fitted over the posts 3 so that these posts pass through the holes 5 and the disc comes to rest against the upper surface of base 2. Then, the posts 3 may be soldered or welded to the disc 4 so to cause the disc 4 to be rigidly held in position on the header.

The semiconductor wafer 7 is then placed on the tongues 6 and, in order to provide an improved heat dissipation, the piece 9 is placed on the wafer 7. Then, each of the electrodes 8*a*, 8*b* and 8*c* of the semiconductor element formed in wafer 7 is soldered to a respective one of the contacting tongues 6*a*, 6*b* and 6*c* and the L-shaped body, whose lower surface is preliminarily provided with a solder layer, is soldered to the wafer 7.

These soldering operations can be carried out, for example, in a continuous-heating furnace and in the presence of a protective gas atmosphere. When all of the soldering and contacting operations have been completed, the resulting intermediate product is further processed by having the areas 10*a*, 10*b* and 10*c* of disc 4 removed so as to electrically isolate the individual electrodes from one another. The regions 10*a*, 10*b* and 10*c* are indicated by broken lines in FIGURE 1. These portions may be removed, for example, by cutting along the broken lines with a heated cutting knife.

They may also be removed in an automatic cutting process in which a plurality of suitably positioned cutting blades are arranged to cut to a predetermined depth so as to completely cut through the disc 4.

When the knife or the blades are heated, they may be applied so as to first soften or melt the edges of portions 10*a*, 10*b* and 10*c* before cutting through disc 4.

Figure 2:
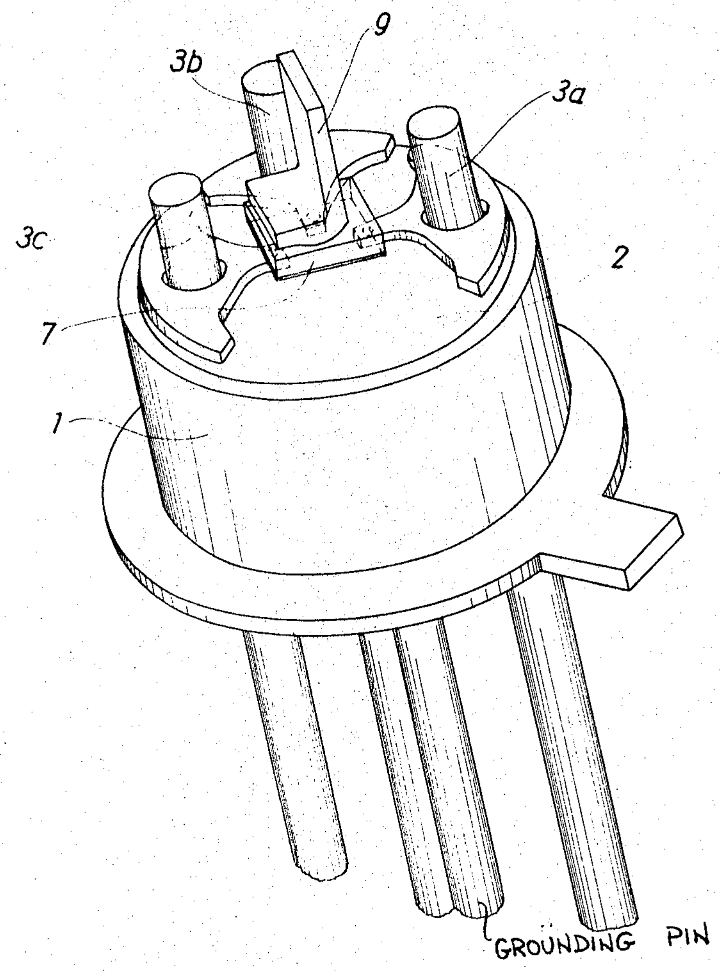
FIGURE 2 is a perspective view showing the semiconductor device of FIGURE 1 in its finished state.

FIGURE 2 shows a finished assembly which has been fabricated in the manner described above. Once the disc 4 has been divided into seperate portions, the completed assembly may be potted in a casting resin or other suitable insulating material for the purpose of increasing the mechanical strength of the assembly. The assembly may then be incapsulated, by means of a can, and hermetically sealed.

Figure 3:
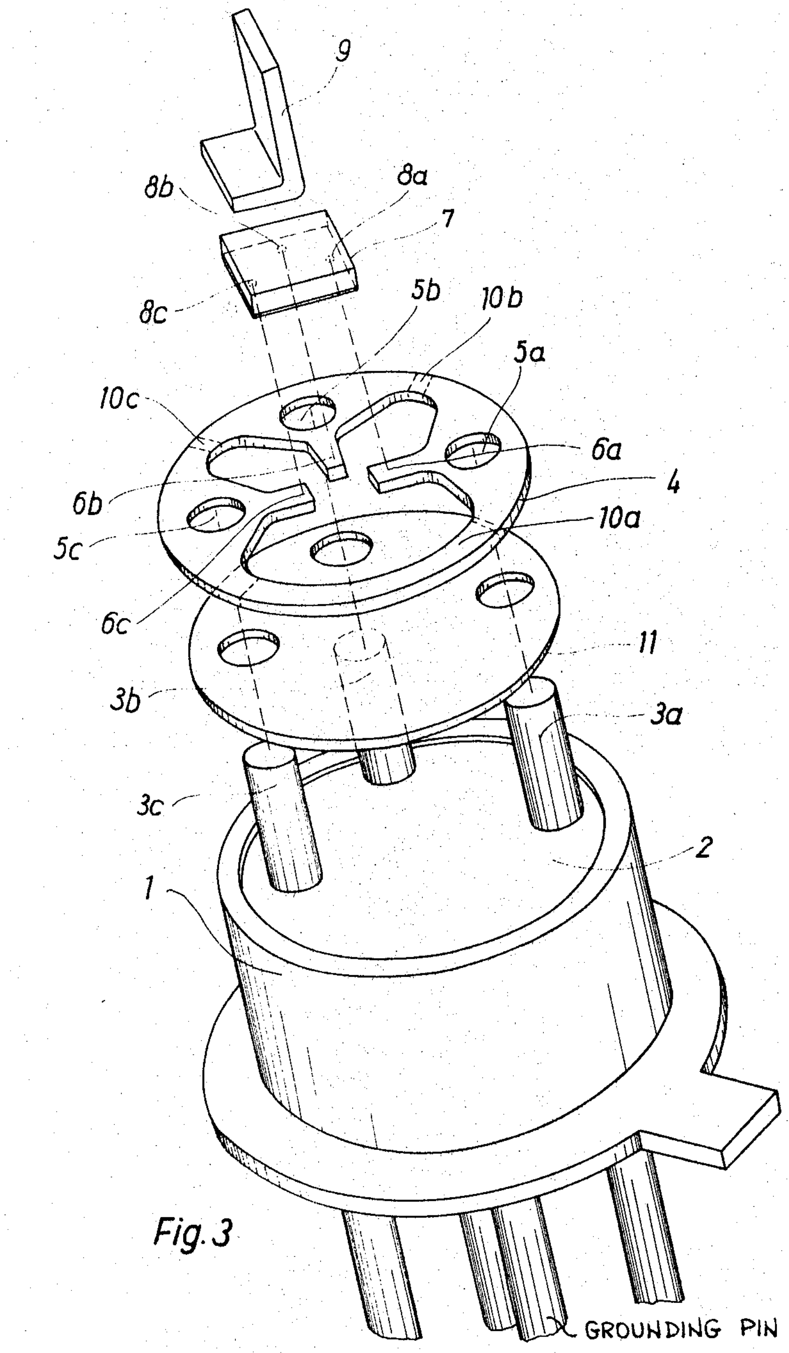
FIGURE 3 is a view similar to that of FIGURE 1 illustrating another arrangement for acrrying out the method of the present invention.

Referring now to FIGURE 3, there are shown the elements of a modified arrangement which can be assembled according to the present invention in those situations in which the base 2 has a metallic upper surface. In this case, the upper surface of base 2 is first covered with a disc 11 made of an insulating material. The disc 11 is preferably in the form of a mica washer having holes therein for the passage of posts 3*a*, 3*b* and 3*c*. The disc 11 may be made of any other suitable insulating material.

After the disc 11 has been placed in position on the upper surface of base 2, the remainder of the arrangement is assembled in exactly the same manner as that described above in connection with FIGURE 1.

It should be noted that the order of steps set forth above for assemblying a semiconductor arrangement need not be rigidly adhered to. For example, the disc 4 need not be soldered to the posts 3 until after the electrodes of the semiconductor formed in wafer 7 have been conductively connected to the tongues 6. As a further example, it would also be possible to first solder the disc to the posts 3, to then remove the portions 10*a*, 10*b* and 10*c*, and to then form the permanent contact between the semiconductor electrodes 8 and the contacting tongues 6.

Although the method according to the present invention has been described above in connection with the assembly of a three-terminal semiconductor device, such as a transistor, it should be appreciated that the present invention can also be employed to provide contacts for other semiconductor devices, such as diodes and integrated circuits for example. The number of inwardly extending tongues with which the contact disc is provided should be made equal to the number of semiconductor element electrodes to be contacted.

The method according to the present invention lends itself particularly well to the contacting of semiconductor elements which have all of their electrodes extending from a single surface. However, the method according to the present invention can also be applied to semiconductor elements of the type in which at least one electrode to be contacted extends from a different surface than the other electrodes to be contacted. In the latter case, all of the electrodes extending from the same surface of the semiconductor element can be electrically connected to associated disc tongues in the manner described above, and the electrode or electrodes extending from other surfaces of the semiconductor element can be conductively connected to associated disc tongues in a conventional manner by means of thin connecting wires, or the like.

It may thus be seen that the present invention provides a novel method for contacting the electrodes of semiconductor elements in which the contacting disc is provided with suitable openings so that it can be slipped over the upper ends of the connecting posts in such a way that the disc will be firmly held by the posts, and thus firmly and securely positioned on the housing base. If the housing base is made of a metallic material it is only necessary, according to an advantageous feature of the present invention, to initially dispose an intermediate disc of insulating material between the base and the contacting disc.

It may also be seen that the necessary soldering of the contacting disc to the terminal posts of the assembly can be performed either before or after permanent contact has been made between the semiconductor electrodes and the contacting tongues of the disc.

The method according to the present invention is particulary well suited for use with semiconductor elements whose electrodes are disposed on one planar surface thereof and extend from this surface, the electrodes having, for example, a hemispherical shape.

It will be understood that the above description of the present invention is susceptible to various modifications, changes, and adaptations, and the same are intended to be comprehended within the meaning and range of equivalents of the appended claims.

What is claimed is:

1. A method for electrically contacting electrodes of a semiconductor element which extended from a surface of the element with terminal posts of a support base, comprising the steps of:

(a) placing a planar contacting disc having a plurality of post-receiving holes, one for each post, and which is cut out to have a plurality of inwardly directed tongues, one for each electrode, adjacent the base so that each post passes through a respective hole, and electrically connecting each post to the disc in the region of its associated hole;

(b) placing the semiconductor element on the disc with the electrodes thereof in contact with the respective tongues and electrically connecting each tongue to a respective electrode; and (c) removing portions of the disc for electrically isolating the electrodes from each other and leaving each electrode electrically connected to only a respective one of the posts.

2. A method as defined in claim 1 wherein the support base is made of insulating material at least at the one surface thereof adjacent which the contacting disc is disposed, and wherein said step of placing the contacting disc is carried out by disposing the disc directly on the one surface of the support base.

3. A method as defined in claim 1 wherein the support base is made of metal, said method comprising the further step of disposing an intermediate disc of insulating material on the one surface of the support base prior to placing the contacting disc adjacent such one surface.

4. A method as defined in claim 3 wherein the intermediate disc is constituted by a mica washer.

5. A method as defined in claim 1 comprising the further step of attaching a heat dissipating body to that surface of the semiconductor element which is opposite its one planar surface.

6. A method as defined in claim 1 wherein said step of removing portions of the disc is carried out by at least softening the edges of the portions to be removed and cutting these portions away by means of heated cutting blades.

7. A method as defined in claim 1 wherein the contacting disc is made of a tin-antimony or lead-arsenic alloy.

8. As an intermediate product in the manufacture of a semi-conductor device, the combination comprising:

(a) a support base having a plurality of terminal posts extending therethrough;

(b) a contacting disc disposed on said base and having a plurality of post-receiving holes, each filled around a respective post, and which is cut out to have a plurality of inwardly directed tongues, each post being electrically connected to said disc in the region adjacent its associated hole; and (c) a semiconductor element having a plurality of electrodes extending from one surface thereof, said element being disposed on said disc with each electrode directly contacting, and being electrically connected to, a respective one of said tongues, whereby upon removal of portions of said disc, each electrode will be conductively connected to only a respective one of said posts.

References Cited

UNITED STATES PATENTS

| | | | |
|---|---|---|---|
| 3,065,525 | 11/1962 | Ingraham et al. | 317—234 X |
| 3,092,893 | 6/1963 | Cornelison et al. | 317—234 X |
| 3,171,187 | 3/1965 | Ikeda et al. | 317—234 X |
| 3,176,191 | 3/1965 | Rowe | 29—589 |
| 3,262,023 | 7/1966 | Boyle | 174—525 |
| 3,281,628 | 10/1966 | Bauer et al. | 29—289 |
| 3,311,798 | 3/1967 | Gray | 317—234 |
| 3,323,071 | 5/1967 | Mitchell | 317—235 |
| 3,324,357 | 6/1967 | Hill | 317—234 |

JOHN W. HUCKERT, *Primary Examiner.*

R. F. POLISSACK, *Assistant Examiner.*

U.S. Cl. X.R.

29—589, 591; 174—68.5